United States Patent Office 3,431,440
Patented Mar. 4, 1969

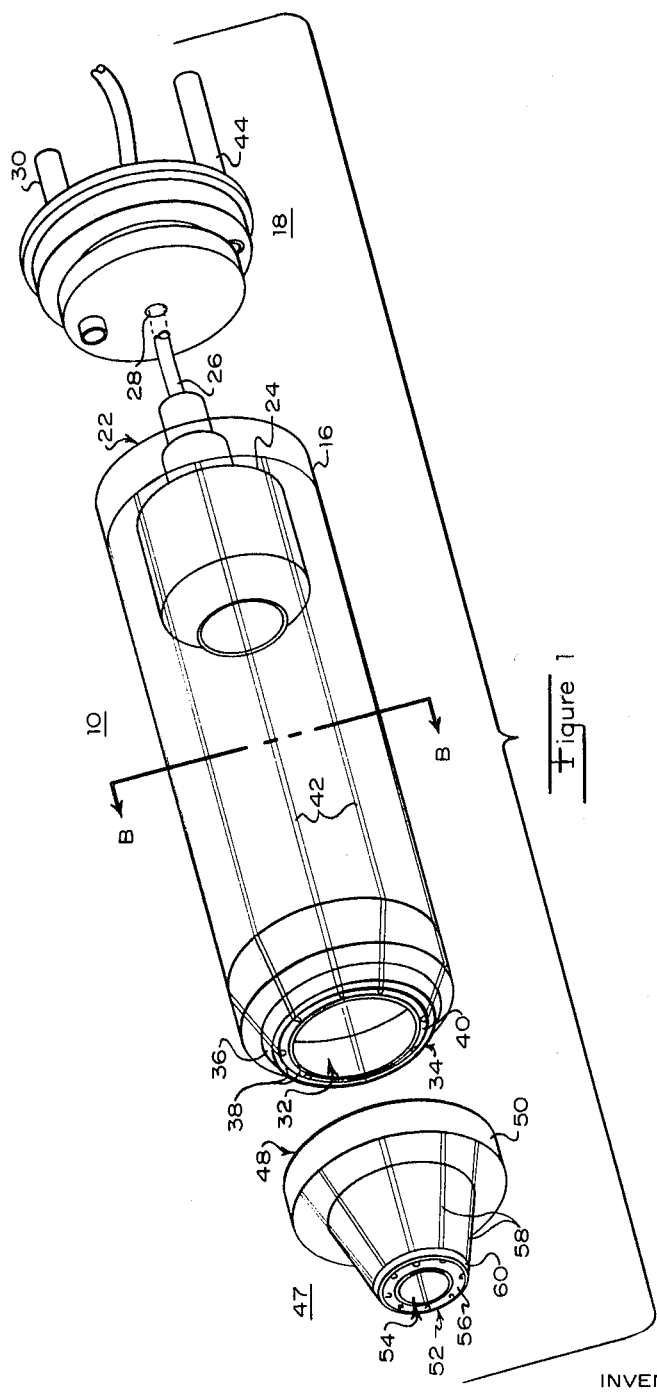

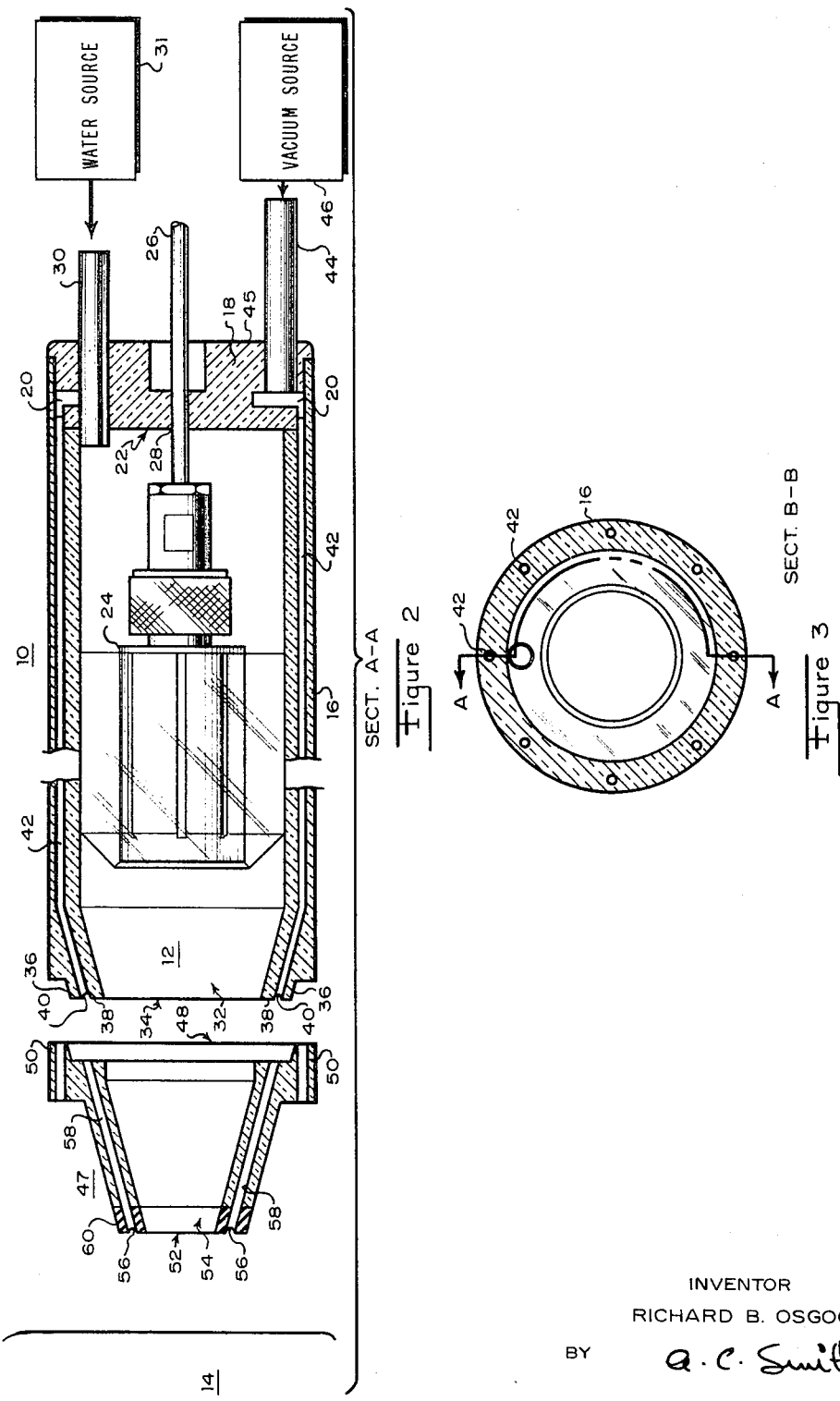

3,431,440
RETAINING APPARATUS FOR AN ULTRASONIC COUPLING MEDIUM
Richard B. Osgood, Los Altos, Calif., assignor to Hewlett-Packard Company, Palo Alto, Calif., a corporation of California
Filed Apr. 1, 1966, Ser. No. 539,505
U.S. Cl. 310—8.1
Int. Cl. H02n 7/00; G01n 9/24, 29/00
5 Claims

ABSTRACT OF THE DISCLOSURE

A cylindrical casing for retaining an ultrasonic coupling medium has an opening at one end for providing contact between the coupling medium and the surface of a test body to be ultrasonically scanned. An annular contact surface of the casing is positioned around this opening and provided with a circular channel. A vacuum source is connected to the circular channel for providing a continuous seal between the contact surface and the test body to retain a static column of the coupling medium within the casing during scanning. An ultrasonic scanning transducer is supported at the other end of the casing in contact with this static column of coupling medium.

---

This invention relates to retaining apparatus for maintaining an ultrasonic coupling medium in intimate contact with the surface of a body during movement of the retaining apparatus along the surface of the body.

Typically, a body to be ultrasonically scanned is alternatively either immersed in a reservoir of an ultrasonic coupling medium such as water or is placed against a reservoir of the ultrasonic coupling medium and in contact with a thin form fitting wall of the reservoir. According to the first alternative the body to be ultrasonically scanned is placed in intimate contact with the ultrasonic coupling medium as required to minimize error signals during the scanning, but it is also subjected to a bath which at least for human bodies may be bothersome and for some even contrary to deep rooted principles. Although the body to be ultrasonically scanned is not subjected to a bath according to the second alternative, neither is it placed in intimate contact with the ultrasonic coupling medium as desired. Moreover, for both alternatives the ultrasonic coupling medium retaining reservoirs are bulky and also inconvenient to use in many ultrasonic scanning applications.

Accordingly, it is an object of this invention to provide an ultrasonic coupling medium retainer which is compact and which may be used without bathing the body to be ultrasonically scanned in the ultrasonic coupling medium.

It is another object of this invention to provide an ultrasonic coupling medium retainer which may more conveniently be used to maintain intimate contact between the ultrasonic coupling medium and the surface of a body during movement of the retainer along the surface of the body.

These objects are accomplished in accordance with the illustrated embodiment of this invention by providing a casing for holding an ultrasonic coupling medium. One end of the casing is provided with an opening and a continuous channel around the opening and is adapted for movement along the surface of a body to be ultrasonically scanned. A source of an ultrasonic coupling medium is connected for filling the casing to provide at the opening intimate contact between the ultrasonic coupling medium and the surface of the body, and a vacuum source is connected for providing around the opening a pressure differential between the continuous channel and the body. This pressure differential provides a seal between the casing and the surface of the body for retaining the ultrasonic coupling medium in the casing during movement of the casing on the body.

Other and incidental objects of this invention will be apparent from a reading of this specification and an inspection of the accompanying drawing in which:

FIGURE 1 is an exploded perspective view of retaining apparatus according to one embodiment of this invention;

FIGURE 2 is a sectional view taken along the line A—A (see FIGURE 3) of the casing of FIGURE 1 when assembled; and FIGURE 3 is a sectional view taken along the line B—B of the casing of FIGURE 1.

Referring now to the drawing, there is shown a casing 10 for retaining an ultrasonic coupling medium 12 such as water and for providing intimate contact between the ultrasonic coupling medium 12 and the surface of a body 14 to be ultrasonically scanned. This casing 10 comprises, for example, a hollow cylindrical member 16 and a generally spool-shaped manifold member 18 for forming an annular air and water tight chamber 20 at the end 22 of the hollow cylindrical member 16. An ultrasonic transducer 24 is coaxially mounted within the hollow cylindrical member 16 for movement therealong and is supported by its power cable 26 which extends through a central longitudinal hole 28 in the spool-shaped manifold member 18. This hole 28 is formed for frictionally engaging the power cable 26 to permit adjustment of the position of the ultrasonic transducer 24 along the hollow cylindrical member 16. A tube 30 also extends through the spool-shaped manifold member 18 and into the hollow cylindrical member 16. This tube 30 is connected to a source 31 of an ultrasonic coupling medium 12 such as water for filling the casing 10 with the ultrasonic coupling medium. A circular opening 32 at the end 34 of the casing 10 provides intimate contact between the surface of the body 14 and the ultrasonic coupling medium 12 retained within the casing 10. The end 34 of the casing 10 is provided with an annular shoulder 36 having a smooth, flat contact surface 38 which is adapted for movement across the surface of the body 14. This annular shoulder 36 includes a continuous annular channel 40 in the flat contact surface 38 around the opening 32. A plurality of conduits 42 extending longitudinally through the cylindrical member 16 at symmetrically spaced intervals therearound communicate at one end with the continuous channel 40 and at the other end with the annular chamber 20. A tube 44 extends through the outer circular plate 45 of the spool-shaped manifold member 18 and into the annular chamber 20. This tube 44 is connected to a vacuum source 46 for providing via the conduits 42 a low pressure at the continuous channel 40 relative to the pressure at each of the body 14, the ultrasonic coupling medium 12, and the atmosphere in which the retaining apparatus is placed. The effective pressure of the ultrasonic coupling medium in the casing 10 and the suction created by the vacuum source 46 at the continuous channel 40 around the opening 32 are made to produce a net force on the retaining apparatus towards the surface of the body 14 so that the suction caused by the pressure differential between the continuous channel 40 and each of the body 14, the ultrasonic coupling medium 12, and the atmosphere seals the contact surface 38 of the annular shoulder 36 to the surface of the body 14. This seal prevents both leakage of the ultrasonic coupling medium 12 from the casing 10 into the surrounding atmosphere and leakage of the surrounding atmosphere into the casing 10. Even if this seal is partially broken there is no leakage either from or into the casing 10 since any leakage that would otherwise escape is sucked up by the vacuum suction provided at the continuous channel 40. The ultrasonic coupling medium 12 serves as a lubricant so that the open end 34 of the casing 10 glides smoothly over the surface of the body 14. Thus, the above-described retaining apparatus maintains the ultrasonic coupling medium 12 in intimate contact with the surface of the body 14 during movement of the retaining apparatus along the surface of the body without subjecting the body 14 to a bath in the ultrasonic coupling medium 12. This retaining apparatus is compact and may conveniently be used by hand or in mechanical scanning apparatus. An added advantage of this retaining apparatus is that it works very well with resilient curved surfaces such as are encountered in ultrasonic scanning applications involving the human body.

A smaller area of contact between the ultrasonic coupling medium 12 and the surface of the body 14 may be desired for some bodies. This smaller area of contact may be provided by attaching a hollow and generally conically shaped member 47 to the open end 34 of the casing 10. The conical member 47 includes at its largest end 48 an annular collar 50 which fits around the annular shoulder 36 at the open end 34 of the casing 10. At its smallest and contact end 52 the conical member 47 includes a small opening 54 for providing contact between the ultrasonic coupling medium 12 and the surface of the body 14. This contact end 52 of the conical member 47 includes a continuous annular channel 56 around the opening 54 and is adapted for movement across the surface of the body 14. A plurality of conduits 58 extending longitudinally through the conical member 47 communicate at one end with the continuous channel 40 in the annular shoulder 36 of the casing 10 and at the other end with the continuous channel 56 in the contact end 52 of the conical member 47. Thus, when the contact end 52 of the conical member 47 is placed in contact with the surface of the body 14 the vacuum suction created by the vacuum source 46 seals the contact end 52 to the surface of the body 14 to prevent leakage of either the ultrasonic coupling medium 12 from the opening 54 or leakage of the surrounding atmosphere into the casing 10 as described above. The contact end 52 of the conical member 47 may be formed from a resilient material as indicated at 60 to provide a better seal with hard surfaced bodies.

I claim:
1. Retaining apparatus for maintaining a static column of fluid ultrasonic coupling medium in contact with an ultrasonic transducer and with a test body to be ultrasonically scanned by moving the transducer and the retaining apparatus along the surface of the test body, said apparatus comprising:
  a casing having an inner chamber for holding a fluid ultrasonic coupling medium and having an opening at one end thereof for providing contact between the ultrasonic coupling medium and the surface of the test body, said casing having a continuous contact surface positioned around said opening and having a continuous channel in said contact surface between a continuous inner portion and a continuous outer portion thereof;
  first inlet means for connecting a vacuum source to said continuous channel to form a first continuous seal between the continuous inner portion of said contact surface and the surface of the test body and to form a second continuous seal between the continuous outer portion of said contact surface and the surface of the test body, said first continuous seal retaining a static column of the ultrasonic coupling medium within the inner chamber of said casing as the retaining apparatus is moved along the surface of the test body and said second continuous seal preventing the surrounding atmosphere from leaking into the inner chamber of said casing as the retaining apparatus is moved along the surface of the test body;
  second inlet means for filling the inner chamber of said casing with the ultrasonic coupling medium; and
  support means for supporting an ultrasonic transducer for movement with the retaining apparatus, said ultrasonic transducer being supported opposite said opening and in contact with the static column of ultrasonic coupling medium retained within the inner chamber of said casing.

2. Retaining apparatus as in claim 1 wherein:
  said first inlet means includes a plurality of conduits in said casing for communicating with said continuous channel at spaced positions therearound and includes a first inlet port communicating with said conduits;
  said second inlet means includes a second inlet port communicating with the inner chamber of said casing; and
  said support means includes a member mounted at the other end of said casing for supporting the ultrasonic transducer within the inner chamber of said casing.

3. Retaining apparatus as in claim 2 wherein said one end of said casing is resilient.

4. Retaining apparatus as in claim 2 including:
  a hollow tapered member having an opening in the larger end thereof and a smaller opening in the smaller end thereof, said smaller end including a contact surface having a continuous channel between a continuous inner portion and a continuous outer portion thereof;
  means for attaching the larger end of said tapered member to said one end of said casing to reduce the contact area between the static column of ultrasonic coupling medium and the surface of the test body; and
  a plurality of conduits positioned in said tapered member for communicating between the continuous channel in said casing and the continuous channel in said tapered member to connect the vacuum source to the continuous channel in said tapered member, whereby the first continuous seal is formed between the continuous inner portion of the contact surface of said tapered member and the surface of the test body and the second continuous seal is formed between the continuous outer portion of the contact surface of said tapered member and the surface of the test body.

5. Retaining apparatus as in claim 2 wherein said support means includes means for adjustably supporting the ultrasonic transducer within the inner chamber of said casing.

References Cited

UNITED STATES PATENTS

| | | | |
|---|---|---|---|
| 2,873,391 | 2/1959 | Schulze | 73—67.9 |
| 2,888,581 | 5/1959 | Pahud | 310—9.1 |
| 2,992,553 | 7/1961 | Joy | 73—67.8 |
| 3,055,210 | 9/1962 | Joy | 73—71.5 |
| 3,148,677 | 9/1964 | Smith | 310—9.1 |
| 3,218,846 | 11/1965 | Joy | 73—67.8 |
| 3,239,801 | 3/1966 | McGaughey | 73—71.5 |

J D MILLER, *Primary Examiner.*

U.S. Cl. X.R.

73—67.8, 71.5; 277—32; 310—8.3, 9.1, 9.6